US012060935B2

United States Patent
Turner et al.

(10) Patent No.: US 12,060,935 B2
(45) Date of Patent: Aug. 13, 2024

(54) GEAR SYNCHRONIZATION CONTROLLER AND RELATED METHOD OF GEAR SYNCRONIZATION TO PREVENT A BLOCKED SHIFT CONDITION FOR A POWER TRANSFERRING GEAR SET OF A WHEEL END MOTOR

(71) Applicant: Electric Propulsion Technologies, LLC, Farmington Hills, MI (US)

(72) Inventors: Douglas D Turner, Lombard, IL (US); John Ogger, Farmington Hills, MI (US); Tomaz Kompara, Ljubljana (SI)

(73) Assignee: Electric Propulsion Technologies, LLC, Farmington Hills, MI (US)

( * ) Notice: Subject to any disclaimer, the term of this patent is extended or adjusted under 35 U.S.C. 154(b) by 0 days.

(21) Appl. No.: 18/523,075

(22) Filed: Nov. 29, 2023

(65) Prior Publication Data
US 2024/0183442 A1    Jun. 6, 2024

Related U.S. Application Data

(60) Provisional application No. 63/429,171, filed on Dec. 1, 2022.

(51) Int. Cl.
*F16H 61/04*    (2006.01)
*F16H 59/40*    (2006.01)
(Continued)

(52) U.S. Cl.
CPC ......... *F16H 61/0403* (2013.01); *F16H 59/40* (2013.01); *F16H 59/42* (2013.01);
(Continued)

(58) Field of Classification Search
CPC .......... F16H 61/0403; F16H 2061/047; F16H 2061/0474; F16H 2061/0422; F16H 59/40; F16H 59/42; F16H 59/46; F16H 59/68

See application file for complete search history.

(56) References Cited

U.S. PATENT DOCUMENTS

| 9,127,728 B2 * | 9/2015 | Merkel | B60W 10/08 |
| 10,086,841 B2 * | 10/2018 | Kuzuhara | B60W 30/19 |
| 11,773,972 B2 * | 10/2023 | Lim | F16H 63/304 |
| | | | 74/335 |

FOREIGN PATENT DOCUMENTS

| DE | 102015222339 A1 | 5/2017 |
| DE | 102012007621 B4 | 11/2017 |

(Continued)

*Primary Examiner* — Huan Le
(74) *Attorney, Agent, or Firm* — Dickinson Wright PLLC

(57) ABSTRACT

A power transferring gearset includes a gear synchronization controller disposed in communication with a drive gear, a driven gear and a shifting mechanism. In response to detecting a gear engagement command, the gear synchronization controller is configured to determine a rotational speed delta between a rotational speed of the drive gear and a rotational speed of the driven gear and compare the rotational speed delta to a pre-determined speed delta. In response to determining that the rotational speed delta is less than the predetermined speed delta, the gear synchronization controller applies a rotational shutter function to the drive gear to apply a series of clockwise and counterclockwise rotational cycles to the drive gear simultaneously during the axial movement of the shifting mechanism for preventing a blocked condition of the power transferring gearset while establishing the meshed relationship between the shifting and gear teeth.

20 Claims, 8 Drawing Sheets

(51) Int. Cl.
*F16H 59/42* (2006.01)
*F16H 59/46* (2006.01)
*F16H 59/68* (2006.01)

(52) U.S. Cl.
CPC ............ *F16H 59/46* (2013.01); *F16H 59/68* (2013.01); *F16H 2061/047* (2013.01); *F16H 2061/0474* (2013.01)

(56) References Cited

FOREIGN PATENT DOCUMENTS

| | | | |
|---|---|---|---|
| DE | 102019203384 | A1 | 9/2020 |
| EP | 4290099 | A1 | 12/2023 |
| KR | 20210126211 | A | 10/2021 |
| RU | 2650330 | C1 | 4/2018 |

\* cited by examiner

GEAR SYNCHRONIZATION CONTROLLER AND RELATED METHOD OF GEAR SYNCRONIZATION TO PREVENT A BLOCKED SHIFT CONDITION FOR A POWER TRANSFERRING GEAR SET OF A WHEEL END MOTOR

CROSS-REFERENCE TO RELATED APPLICATION

The subject application claims the benefit of U.S. Provisional Application Ser. No. 63/429,171 filed on Dec. 1, 2022, the entire disclosure of which is incorporated herein by reference.

FIELD OF THE DISCLOSURE

The present disclosure relates generally to vehicle transmission devices, such as motors for a vehicle. More specifically, the present disclosure relates to a method of operating a power transferring gearset associated with a wheel end motor of a vehicle.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to at least one wheel using mechanical devices such as transmissions, transaxles, propeller shafts, and live axles. These configurations work well when the prime mover can be bulky or heavy, such as, for example, various internal combustion engines ("ICE") and centralized electric axles. However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations (all considered in-wheel or wheel-end electric motors in accordance with the subject disclosure) are one alternative arrangement for the traditional ICE or centralized electric axle prime mover that distribute the prime mover function to each or some of the plurality of wheels via one or more electric or non-electric motors (such as a hydrostatic motor) disposed on, within, or proximate to the plurality of wheels. Specifically, when leveraging in-wheel motors (IWM) for an e-mobility solution, the electric vehicle could have two such motors in a rear-wheel or front-wheel drive configuration or it might have four IWMs for an all-wheel drive configuration. Other configurations with a different number of IWMs are possible, the minimum being one IWM with no limit as to the maximum.

These wheel-end motors often include a power transferring gearset having a drive gear and a driven gear for transferring torque/power from the motor to a wheel of the vehicle. The power transferring gearset can include a shifting mechanism for being advanced towards and into selectively coupling relationship with one of the drive or driven gear (depending on which gear the shifting mechanism is operably coupled) to effectuate this transfer of torque/power from the motor. However, as illustrated in FIG. 1, the shifting mechanism and the drive or driven gear each include respective shifting teeth 10 and gear teeth 12 which can come into abutting (i.e., direct tooth-to-tooth) relationship with one another during axial movement of the shifting mechanism, preventing operable coupling of the shifting teeth and the gear teeth and creating a blocked shift condition for the power transferring gearset. If as shown in FIGS. 12-13, the shifting mechanism moves (e.g., pushes) one of the drive or driven gear towards and into engagement with the other of the drive or driven gear (as opposed to movement of the shifting mechanism to establish an operably coupled relationship between the drive gear and the driven gear), the shifting teeth 10 of FIG. 1 would alternatively be represented as drive gear teeth 10 of the drive gear, with the gear teeth 12 represented as driven gear teeth 12 of the driven gear. In either arrangement, the blocked shift condition is more likely to occur at low/zero rotational delta speeds between the drive gear and the driven gear because the shifting teeth 10 and the gear teeth 12 have a higher probability of being disposed in axially tooth-to-tooth aligned relationship with one another (such as shown in FIG. 1) and thus without sufficient delta speeds or delta position to create an offset relationship (such as shown in FIGS. 2-3) that would allow tapered edges of the respective teeth 10, 12 to come in contact with one another as force is applied by the shifting mechanism, permitting the respective teeth 10, 12 to ride down the tapered edges to a gear engagement state (as shown in FIG. 3) during movement of the shifting mechanism.

With reference to FIG. 4, power transferring gearsets in a traditional ICE transmission often add at least one mechanical synchronizer 14 having a plurality of mechanical components to synchronize rotation of the driven gear and the drive gear to the same speed and prevent the blocked shift condition. More specifically, these traditional mechanical synchronizers 14 often include a shift sleeve 16 as the shifting mechanism (also referred to as a slider), a plurality of struts 18 (or keys or balls, depending on the specific design), a blocker ring 20 (also referred to as a baulk ring), and a synchronizer cone 22 (applied to the target drive gear). In operation, when the shift sleeve 16 is moved to change gears, the shift sleeve 16 is slid axially and pushes against the struts 18, which then push against the blocker ring 20. The blocker ring 20 is then pushed against the synchronizer cone 22, and friction causes shaft speeds to equalize. At equal speeds, keys and notches in the blocker ring align, and then slider teeth mesh with teeth along an outside diameter of the blocker ring 20. As more force is applied, friction aligns the rotational speed of the shift sleeve 16, the blocker ring 20 and the synchronizer cone 22, and shifting is complete when the shifting sleeve 16 engages with the gear teeth on the blocker ring 20 and the gear teeth on the synchronizer cone 22.

However, the use of mechanical synchronizers 14 to synchronize the drive gear and the driven gear requires multiple mechanical components which add cost, complexity and a larger overall footprint (i.e. a larger size requirement) for the power transferring gearset. Accordingly, the use of the mechanical synchronizer in a power transmission gearset for a wheel end motor does not achieve the sought after objectives of eliminating mechanical driveline components and providing a lighter-weight vehicle with more space for passengers and payload. Thus, there remains a continuing need for an alternative means of synchronizing a drive gear and a driven gear in a power transmission gearset, particularly when utilized in association with a wheel-end motor as an alternative transmission arrangement for an electric vehicle.

SUMMARY OF THE INVENTION

The subject invention is generally directed to a gear synchronization controller and related method of synchronizing a drive gear and a driven gear of a power transmission gearset based on applying a rotational shutter function to the drive gear, particularly during a "zero speed" engagement command of the shifting mechanism, to prevent the occurrence of the blocked shift condition. More specifically, when a gear engagement command for the power transmission gearset is determined to occur during a low or zero speed delta condition between the drive gear and the driven gear, signifying the potential for tooth-to-tooth direct contact been the shifting teeth of the shifting mechanism and the gear teeth of the drive gear (or the gear teeth of the drive gear and the gear teeth of the driven gear, in an alternative arrangement), a rotational shutter function is applied to the drive gear based on at least one frequency, torque or speed rotational characteristic, in a steady manner or a series of pulses, to move (i.e., rotate) the drive gear simultaneously during axial movement of the shifting mechanism prior to the state where contact between the shifting gear teeth and the drive gear teeth first occur (or the gear teeth on the driven gear and the gear teeth on the drive gear, in the alternative arrangement), for increasing the probability of the tapered, offset relationship shown in FIGS. 2-3 and prevent the blocked shift condition shown in FIG. 1. The term "zero speed" as used in the subject disclosure is considered to be occurring not only when the vehicle is at a stand-still condition, but also when the motor speed is within a small delta speed range when compared to the gearset speed which is derived by the transformation of road speed via the wheel and associated gearset(s) ratio relationship.

As will be appreciated in view of the following more detailed disclosure, use of the gear synchronization controller and related control method to achieve gear synchronization during these "zero speed" engagement conditions (i.e., when the rotational speed delta between a rotational speed of the drive gear and a rotational speed of the driven gear is less than a predetermined low or zero speed delta) does not rely on a collection of mechanical components (i.e., the mechanical synchronizer) and thus reduces costs (both material cost and maintenance cost) and saves packaging space for the power transmission gearset. From another vantage point, the control method can be tailored to support different models/generations of the end solution for the associated wheel end motor. For example, if the current design of the electric motor and/or the associated power transmission gearset is scaled up or down to meet a particular end-user's need, while elements of the shifting mechanism may be changed, there is no need to cast/forge/stamp new mechanical components associated with gear synchronization, thus providing further savings in engineering and capital equipment costs.

Other advantages will be appreciated in view of the following more detailed description of the subject invention.

BRIEF DESCRIPTION OF THE DRAWINGS

The drawings described herein are for illustrative purposes only of selected aspects and not all possible implementations and are not intended to limit the scope of the present disclosure.

DETAILED DESCRIPTION OF THE ENABLING EMBODIMENTS

Exemplary aspects of a gear synchronization controller and related control method for achieving gear synchronization of the power transferring gearset, such as for an IWM, particularly during a low or zero speed engagement condition, will now be more fully described. Although the control methodology will be described in relation to this low or zero speed engagement condition, the principles of the gear synchronization controller and related control methodology could also be applied during a high-speed engagement condition without departing from the scope of the subject disclosure. Each of these example embodiments are provided so that this disclosure is thorough and fully conveys the scope of the inventive concepts, features, and advantages to those skilled in the art. To this end, numerous specific details are set forth such as examples of specific components, devices, mechanisms, flow charts, or process steps associated with the algorithm and methodology to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure. Additionally, the methodology described in more detail below, is applicable to both partial or full electric vehicles, a power transferring gearset that is connected with a singular or bi-directional rotational motor, as well as during a high-speed engagement condition of the high speed slider clutch as mentioned above, without departing from the scope of the subject disclosure.

Figure 5:
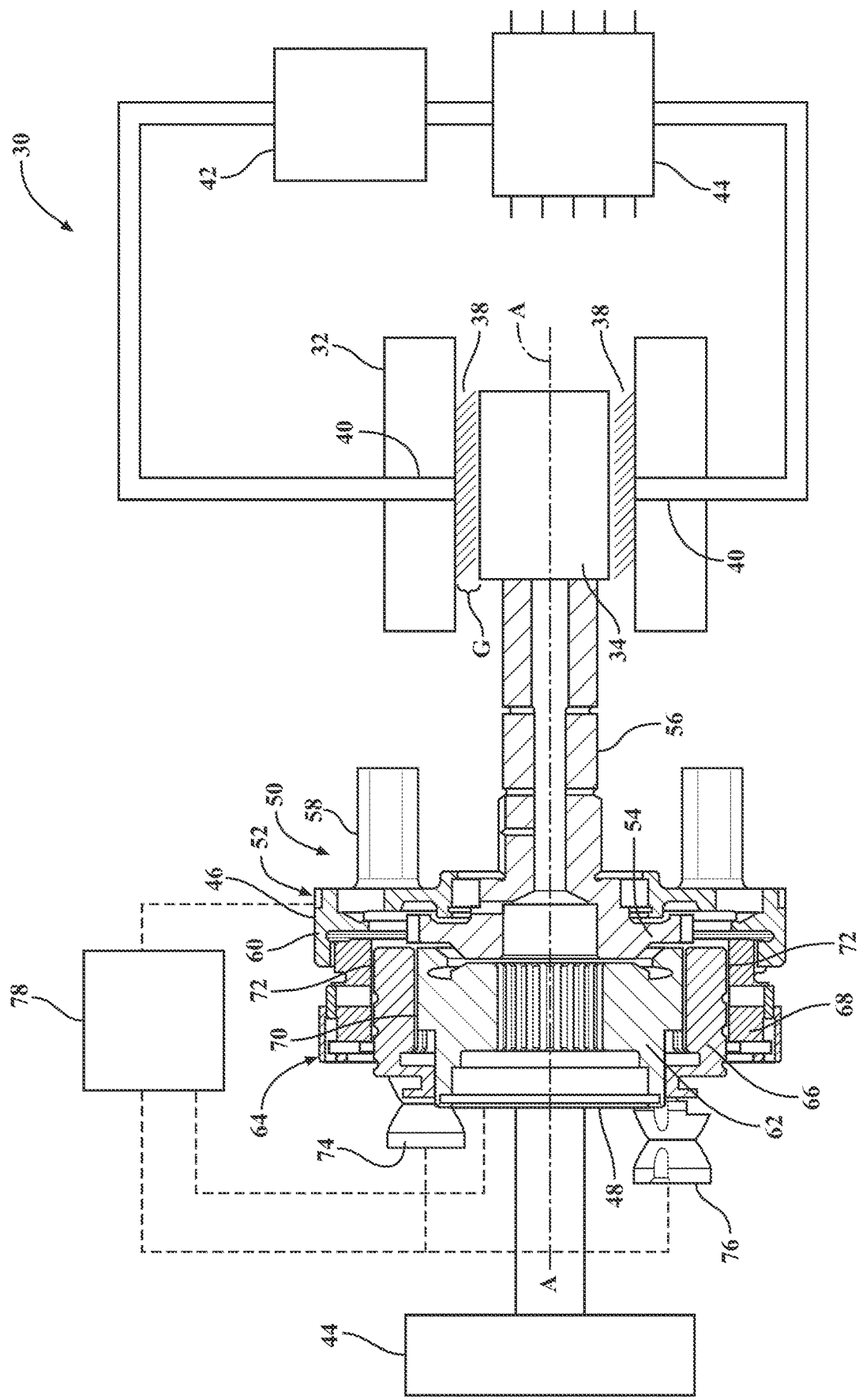
FIG. 5 is a cross-sectional view of a power transferring gearset for an exemplary wheel-end electric motor illustrating a low speed slider clutch of the shifting mechanism operably coupled with and slidable relative to an output gear (driven gear) and into an actuated position to dispose the shifting teeth in meshed relationship with the gear teeth and establish selective coupling between the output gear (driven gear) and a ring gear (drive gear) of a first stage planetary gear reducer assembly and a low speed condition for the power transferring gearset and the wheel-end electric motor.
Figure 6:
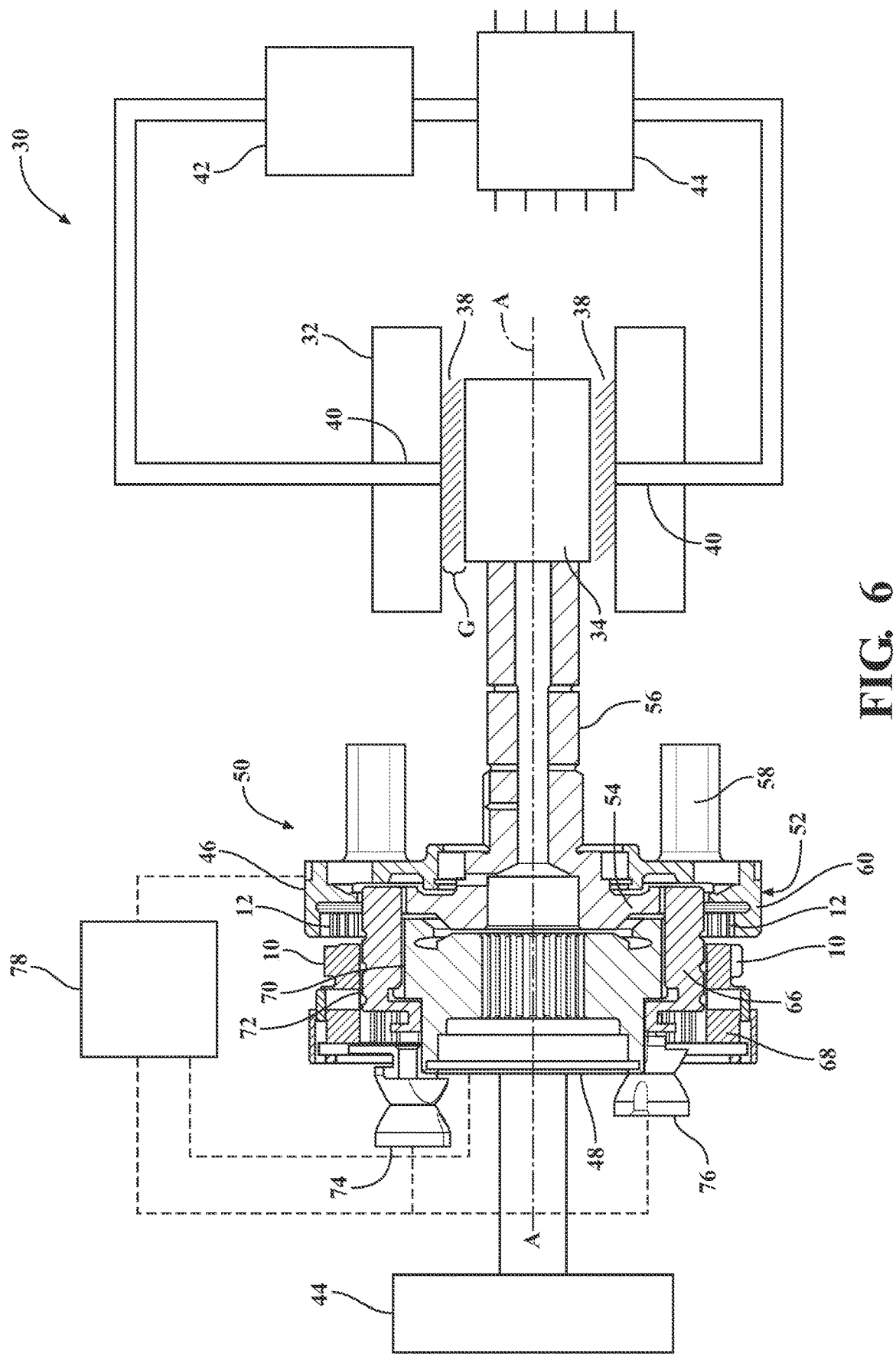
FIG. 6 is a cross-sectional view of the power transferring gearset for the exemplary wheel-end electric motor illustrating a high-speed slider clutch of the shifting mechanism disposed in an actuated position during a high speed condition for the power transferring gearset and the wheel-end electric motor.

FIGS. 5-6 illustrate a lubricant supported electric motor 30 in accordance with an aspect of the disclosure. However, although the control method for gear synchronization will be described in detail in relation to the lubricant supported electric motor 30, it should be appreciated that the lubricant supported electric motor 30 is exemplary to provide an enabling disclosure and the gear synchronization control method could be applied to other types of electric or non-electric motors (e.g., roller bearing electric motors or other electric motors utilized in wheel-end or even non-vehicle applications, and singular/bi-directional rotation motors such as hydrostatic motors or pneumatic motors) without departing from the scope of the subject disclosure. But, in this exemplary arrangement, the lubricant supported electric motor 30 includes a stator 32 and a rotor 34 extending along an axis A and rotatably disposed within the stator 32 to define a gap G therebetween. A lubricant 38 is disposed in the gap G for individually supporting the rotor 34 within the stator 32, and providing continuous contact between these components. The lubricant 38 may therefore act as a buffer (e.g., suspension) between the rotor 34 and the stator 32 minimizing or preventing contact therebetween. In other words, the lubricant 38 prevents direct contact between the stator 32 and rotor 34 and provides a lubricant supported electric motor 30 which is robust to shock and vibration loading due to the presence of the lubricant 38. Additionally, and alternatively, a substantially incompressible lubricant 38 may be used in order to minimize the gap G between the stator 32 and the rotor 34.

As further illustrated in FIGS. 5-6, the stator 32 defines a passageway 40 disposed in fluid communication with the gap G for introducing the lubricant 38. However, the passageway 40 could be provided on any other components of the lubricant supported electric motor 30 without departing from the scope of the subject disclosure. According to an aspect, the lubricant 38 may be cycled or pumped through the passageway 40 and into the gap G in various ways. For example, a high-pressure source (e.g., a pump) 42 of the lubricant 38 may be fluidly coupled to a low-pressure source (e.g., a sump) 44, where the lubricant 38 may move from the high pressure source 42 to the low-pressure source 44, through the passageway 40 and into the gap G. Rotation of the rotor 34 relative to the stator 32 may operate as a self-pump to drive lubricant 38 through the passageway 40 and into the gap G.

As further illustrated in FIGS. 5-6, the rotor 34 is operably interconnected to a power transferring gearset 50 for coupling the lubricant supported electric motor 30 to at least one wheel 44 of an electric vehicle, and thus transferring torque/power from the lubricant supported electric motor 30 to drive the wheel 44 of the electric vehicle. The power transferring gearset 50 includes a drive gear 46 and a driven gear 48 each rotatable about the axis A. In the exemplary arrangement shown in FIGS. 5-6, the power transferring gearset 50 can include a first stage planetary gear reducer assembly 52 operably connected with the rotor 34 for rotation therewith. In this exemplary arrangement, the first stage planetary gear reducer assembly 52 is sun driven and includes a sun gear 54 rotatably aligned along the axis A and in operably interconnected relationship with the rotor 34 via a rotor shaft 56. An alternative way of arranging the lubricant supported electric motor 30 and establishing the operable connection between the rotor 34 and the sun gear 54 is described and illustrated in Applicant's U.S. application Ser. No. 17/575,677, the disclosure of which is incorporated herein by reference as a suitable alternative embodiment for use with the subject control method. As further illustrated in FIGS. 5-6, the first stage planetary gear assembly 52 includes a planet carrier 58 rotatably supporting a plurality of planet gears (not expressly shown) arranged radially outwardly of and operably connected to the sun gear 54, and a ring gear 60 is arranged concentrically around and operably connected to the planet gears for rotation about the axis A in response to rotation of the sun gear 54. As best illustrated in FIG. 6, the ring gear 60 functions as the drive gear 46 in a low speed shifting condition and presents the plurality of gear teeth 12 arranged concentrically around the ring gear 60 and extending radially inward towards the axis A. However, as will be appreciated in view of the following disclosure, the sun gear 54 could function as the drive gear 46 if the gear operating principles are applied to a high-speed shifting condition, in which case the gear teeth 12 would extend radially outwardly from the axis A. As further illustrated in FIGS. 5-6, in either arrangement, the power transferring gearset 50 includes an output gear 62 rotatably aligned along the axis A and disposed adjacent the sun gear 54 to function as the driven gear 48.

As best illustrated in FIGS. 5-8, the power transferring gearset 50 includes a shifting mechanism 64 operably coupled with one of the driven gear 48 (See FIGS. 5-6) or the drive gear 46 (See FIGS. 7-8) for rotation therewith. The other of the driven gear 48 or the drive gear 46 (to which the shifting mechanism 64 is not operably coupled in a non-shifting condition) presents the plurality of gear teeth 12 arranged concentrically about the axis A. For example, as noted immediately above in relation to the embodiment shown in FIGS. 5-6, if the shifting mechanism 64 is operably coupled with the driven gear 48 (the output gear 62 in this exemplary arrangement), the drive gear 46 (i.e., the ring gear 60 in this exemplary arrangement) can present the gear teeth 12. However, as alternatively shown in FIGS. 7-8, if the shifting mechanism 64 is operably coupled with the drive gear 46, the driven gear 48 (such as the output gear 62) can present the gear teeth 12 arranged concentrically about the axis A. In either arrangement, the shifting mechanism 64 presents the plurality of shifting teeth 10 arranged concentrically about the axis A, and the shifting mechanism 64 is axially slidable relative to the operably coupled one of the drive gear 46 or the driven gear 48 in response to a gear engagement command to advance the shifting teeth 10 towards and into meshed relationship with the gear teeth 12 for establishing the meshed relationship and selectively transferring torque from the drive gear 46 to the driven gear 48. As will be described in more detail below, the shifting mechanism 64 can effectuate the transferring of adjustable torque to a final drive module (which is not expressly illustrated but operably connected sequentially or downstream from the output gear 62) for transferring power/torque to the wheel(s) 44 of the vehicle.

In the exemplary arrangement, the shifting mechanism 64 can include at least one slider clutch 66, 68 which is rotatable with and axially slidable relative to the output gear 62 (in the exemplary arrangement) from a neutral position wherein the at least one slider clutch 66, 68 is disposed in spaced and non-engaging relationship with the first stage planetary gear assembly 52 to an engagement position wherein the at least one slider clutch 66, 68 is moved axially towards and into selectively coupled relationship with the first stage planetary gear assembly 52 to establish the selective coupling between the first stage planetary gear assembly 52 and the output gear 62. Although the shifting mechanism 64 will be described in relation to a slider clutch, the shifting mechanism 64 could also take a number of different forms, such as wet or dry plate clutches, conical synchronizers, or the like, to achieve the plurality of different functions (such as the high gear condition/function illustrated in FIG. 6, and the low gear condition function illustrated in FIG. 5) for the power transferring gearset 50.

The shifting mechanism 64 preferably includes a plurality of slider clutches 66, 68 for establishing the multiple functions (i.e., high gear and low gear) for the power transferring gearset 50. In this preferred arrangement, and as best illustrated in FIGS. 5-6, the plurality of slider clutches 66, 68 includes a high-speed slider clutch 66 and a low speed slider clutch 68 concentrically and slidably arranged relative to one another, and collectively secured to the output gear 62 for rotation therewith. More specifically, the high-speed slider clutch 66 is concentrically and slidably received along an outer sliding gear surface 70 of the output gear 62 for axially sliding from a neutral position (in which no rotational torque is directly transferred from the first planetary gear assembly 52 to the output gear 62) to the respective engaged position shown in FIG. 6 in which the high-speed slider clutch 66 is moved into operably interconnected relationship with the sun gear 54. In this engaged position, rotation of the sun gear 54 drives corresponding rotation of the high speed slider clutch 66 as well as the output gear 62 to which the high-speed slider clutch 66 is operably connected for establishing a high gear for the power transferring gearset 50 and the associated lubricant supported electric motor 30.

The low-speed slider clutch 68 is also concentrically and slidably received along an outer sliding clutch surface 72 of the high-speed slider clutch 66 for axially sliding from a neutral position to the respective engaged position shown in FIG. 5 in which the low-speed slider clutch 68 is moved into operably interconnected relationship with the ring gear 60. In this engaged position, the low-speed slider clutch 68 includes the shifting teeth 10 which are moved into meshed relationship with the gear teeth 12 extending along the ring gear 60 such that rotation of the ring gear 60 drives corresponding rotation of the low speed slider clutch 68 as well as the output gear 62 to which the low speed slider clutch 68 is operably connected via the high speed slider clutch 66 (i.e., because the output gear 62, the high speed slider clutch 66, and the low speed slider clutch 68 are concentrically arranged on one another to simultaneously rotation in unison about the axis A). In this arrangement, the low speed slider clutch 68 establishes a low gear for the power transferring gearset 50 and the associated lubricant supported electric motor 30.

As further illustrated in FIGS. 5-6, the power transferring gearset 50 can include at least one low speed actuator 74 operably connected to the low-speed slider clutch 68 and at least one high speed actuator 76 operably connected to the high speed slider clutch 66 for effectuating movement of the slider clutches 66, 68 from their neutral to engaged positions. A gear synchronization controller 78 is disposed in electrical communication with the low and high-speed actuators 74, 76 for controlling their actuation based on a condition of the vehicle and a requested gear (e.g., low gear or high gear) for the power transferring gearset 50 and the associated lubricant supported electric motor 30 during a low or high speed shifting condition.

Figure 7:
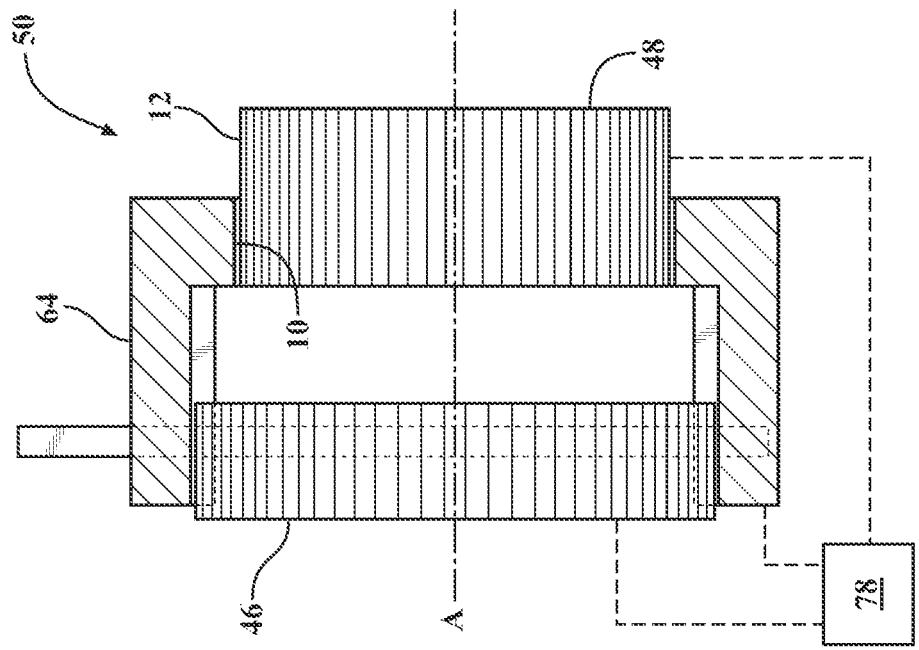
FIG. 7 is a cross-sectional view of an alternative arrangement of the power transferring gearset in which the shifting mechanism is alternatively operably coupled with and slidable relative to the drive gear.
Figure 8:
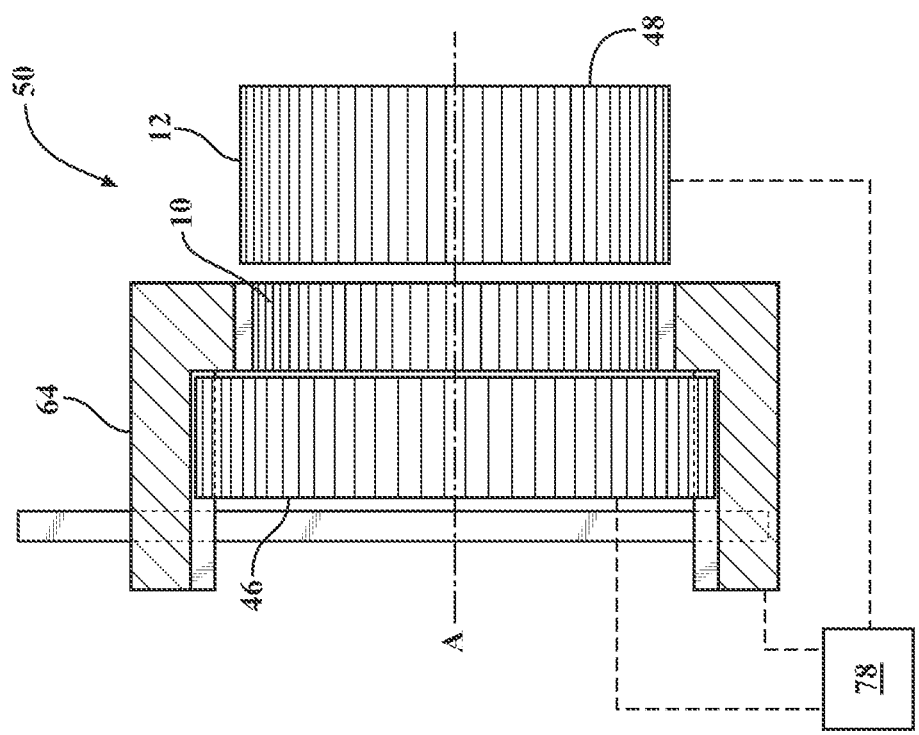
FIG. 8 a cross-sectional view of the alternative arrangement of the power transferring gearset illustrating the shifting mechanism axially slid into the actuated position to dispose the shifting teeth in meshed relationship with gear teeth alternatively disposed on the driven gear.
Figure 9:
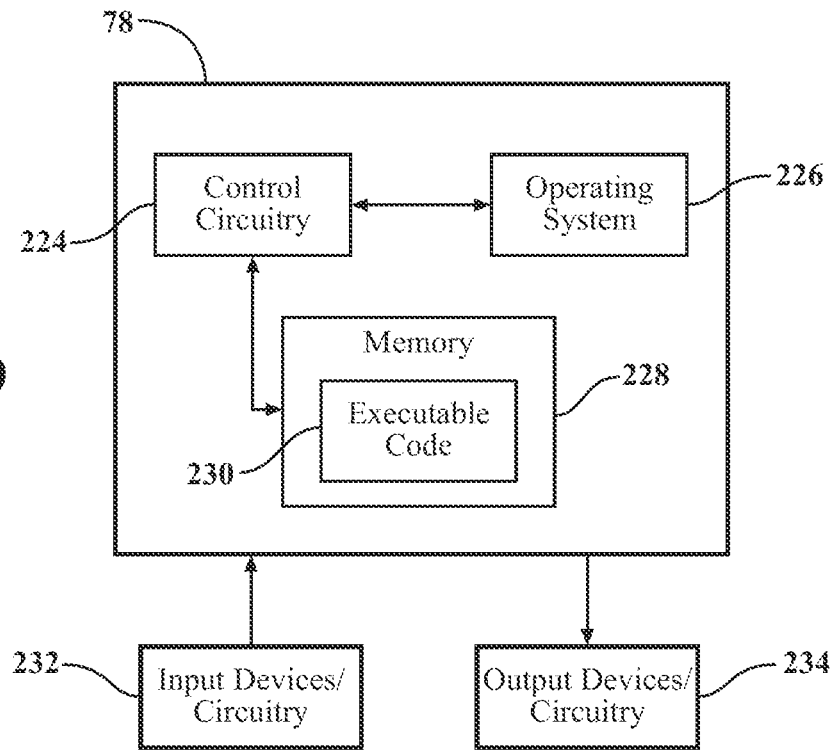
FIG. 9 is a schematic view of a gear synchronization controller of the power transferring gearset.

FIG. 7 shows a block diagram of an example gear synchronization controller 78 configured to (and/or including circuitry configured to) implement the functions of the systems and methods described herein. Systems described herein may implement a single computing device, a plurality of computing devices, etc. configured to individually and/or collectively perform functions related to the systems and methods of the present disclosure.

The gear synchronization controller 78 may include control circuitry 224 that may be, for example, one or more processors or processing devices, a central processing unit processor (CPU), an integrated circuit or any suitable computing or computational device, an operating system 226, memory 228, executable code 230, input devices or circuitry 232, and output devices or circuitry 234. The control circuitry 224 (or one or more controllers or processors, possibly across multiple units or devices) may be configured to implement functions of the systems and methods described herein. More than one of the gear synchronization controllers 78 may be included in, and one or more of the gear synchronization controllers 78 may act as the components of, a system according to embodiments of the disclosure. Various components of the gear synchronization controller 78 may be implemented with same or different circuitry, same or different processors or processing devices, etc.

The operating system 226 may be or may include any code segment (e.g., one similar to the executable code 230 described herein) designed and/or configured to perform tasks involving coordination, scheduling, arbitration, supervising, controlling or otherwise managing operation of the control circuitry 224, for example, scheduling execution of software programs or tasks or enabling software programs or other hardware modules or units to communicate. The operating system 226 may be a commercial operating system. It will be noted the operating system 226 may be an optional component (e.g., in some embodiments, a system may include a computing device that does not require or include the operating system 226). For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 228 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short-term memory unit, a long-term memory unit, or other suitable memory units or storage units. The memory 228 may be or may include a plurality of, possibly different memory units. The memory 228 may be a computer or processor non-transitory readable medium, or a computer non-transitory storage medium, e.g., RAM.

The executable code 230 may be any executable code, e.g., an application, a program, a process, task, or script. The executable code 230 may be executed by the control circuitry 224, possibly under control of the operating system 226. Although, for the sake of clarity, a single item of the executable code 230 is shown, a system according to some embodiments of the disclosure may include a plurality of executable code segments similar to the executable code 230 that may be loaded into the memory 228 and cause the control circuitry 224 to carry out methods described herein. Where applicable, the terms "process" and "executable code" may be used interchangeably herein. For example, verification, validation and/or authentication of a process may mean verification, validation and/or authentication of executable code.

In some examples, the memory 228 may include non-volatile memory having the storage capacity of a storage system. In other examples, the gear synchronization controller 78 may include or communicate with a storage system. Such a storage system may include, for example, flash memory as known in the art, memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in the storage system and loaded from the storage system into the memory 228 where it may be processed by the control circuitry 224.

The input circuitry 232 may be or may include any suitable input devices, components or systems, e.g., physical sensors such as accelerometers, thermometers, microphones, analog to digital converters, etc., a detachable keyboard or keypad, a mouse, etc. The output circuitry 234 may include one or more (possibly detachable) displays or monitors, motors, servo motors, speakers, high side driver, low side driver, and/or any other suitable output devices. Any applicable input/output (I/O) devices may be connected to the control circuitry 224. For example, a wired or wireless network interface card (NIC), a universal serial bus (USB) device, JTAG interface, or external hard drive may be included in the input circuitry 232 and/or the output circuitry 234. It will be recognized that any suitable number of input devices and output devices may be operatively connected to the control circuitry 224. For example, the input circuitry 232 and the output circuitry 234 may be used by a technician or engineer in order to connect to the control circuitry 224, update software, and the like.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 228, computer-executable instructions such as the executable code 230, and a controller such as the control circuitry 224.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the control circuitry 224), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the control circuitry 224.

As previously mentioned, when a "low or zero" speed engagement command is received by the controller 78, namely a request to shift the power transferring gearset 50 into the low speed gear condition from a park or stand-still condition of the electric vehicle, or the other "zero or low speed" conditions explained in the introductory section in which there is a low or zero speed delta between the driven and drive gears 46, 48 (as will be explained in more detail below), there is an increased potential for tooth-to-tooth direct contact between the shifting teeth 10 on the shifting mechanism 64 (e.g., the low speed slider clutch 68) and the gear teeth 12 on the driven or drive gear 46, 48 (e.g., ring gear 60), which if present would result in a blocked shift condition for the power transferring gearset 50. Thus, the gear synchronization controller 78 is configured to operate a method of gear synchronization for the driven and drive gears 46, 48 based on applying a rotational shutter function (e.g., frequency force, and/or speed) to the drive gear 46 (i.e., ring gear 60) to prevent the occurrence of the blocked shift condition.

Figure 3:
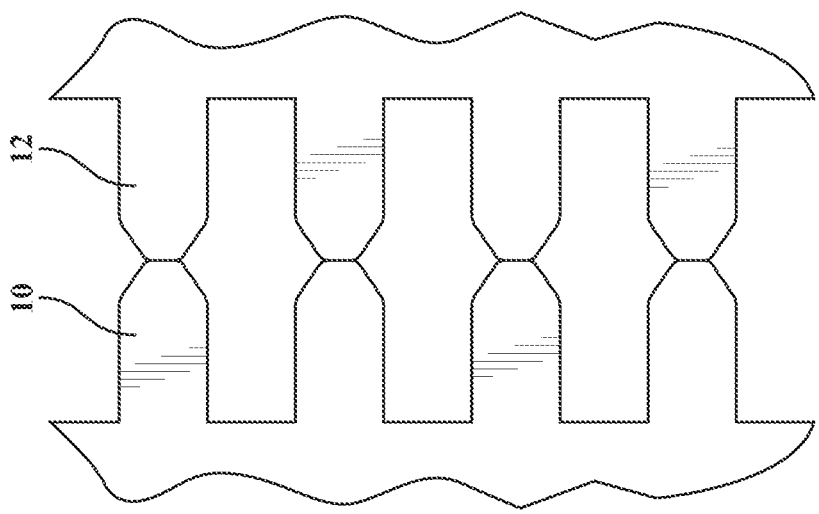
FIG. 3 illustrates the shifting teeth and the gear teeth disposed in the engagement state.
Figure 2:
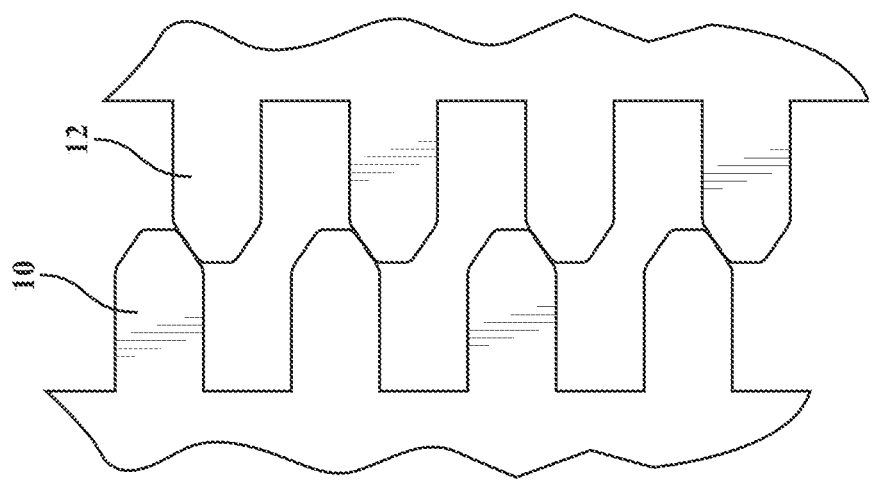
FIG. 2 illustrates the shifting teeth and the gear teeth disposed in off-set relationship during axial movement of the shifting mechanism to allow the shifting teeth and the gear teeth to ride down respective tapered edges to establish an engagement state.
Figure 1:
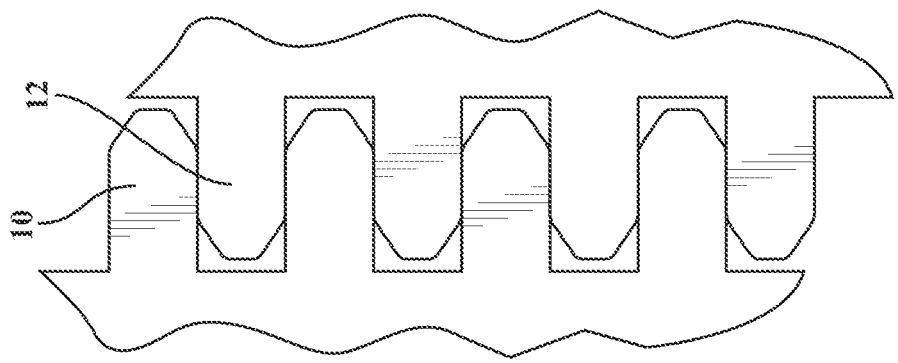
FIG. 1 illustrates a blocked shift condition for a power transferring gearset in which shifting teeth of a shifting mechanism and gear teeth of a drive or driven gear are disposed in abutting (i.e., tooth-to-tooth) relationship during axial movement of the shifting mechanism towards one of the drive or driven gears.
Figure 4:
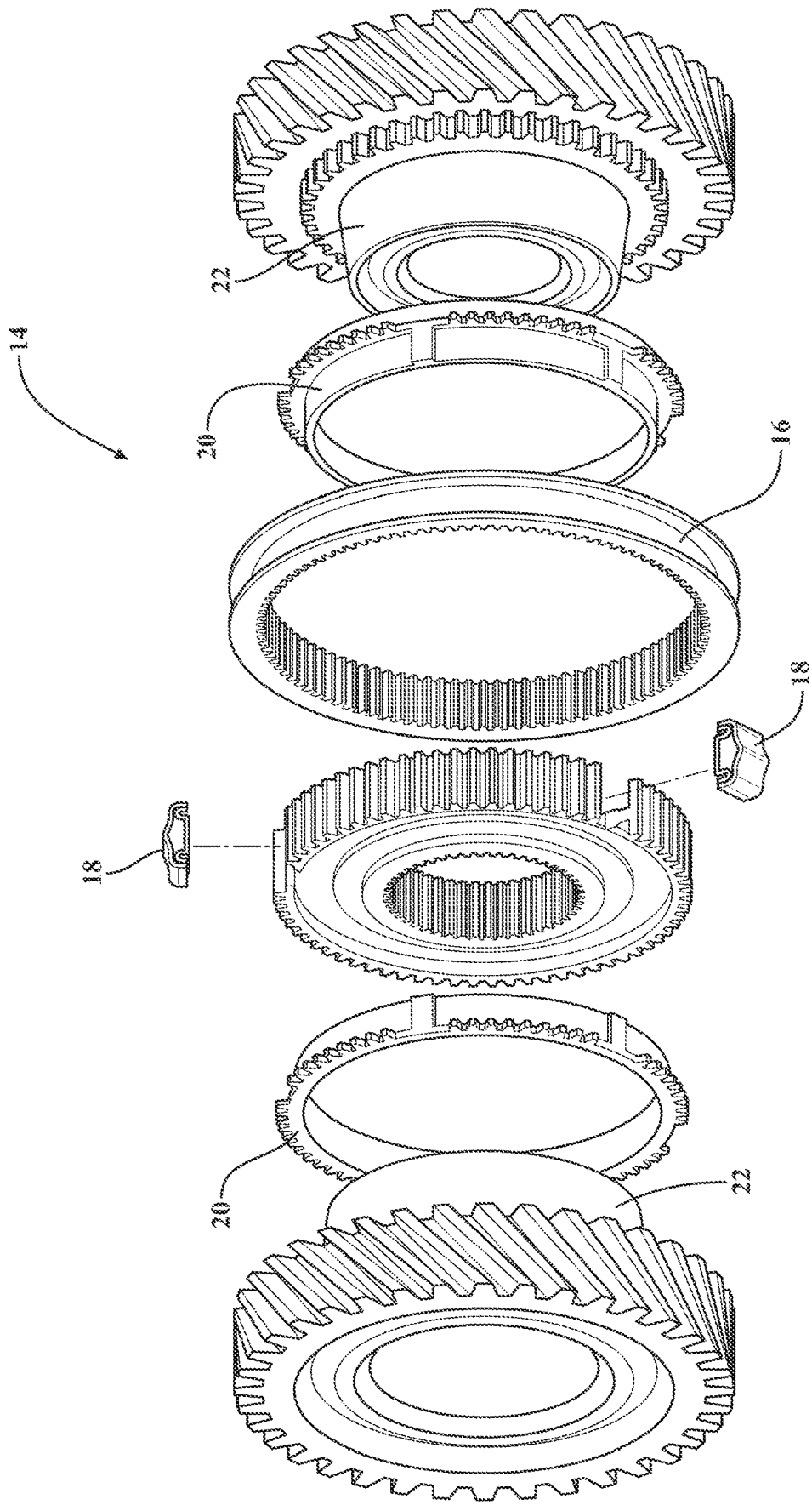
FIG. 4 is a perspective view of a prior art mechanical synchronizer for use in a power transferring gearset of a traditional ICE transmission for synchronizing the drive gear and the driven gear to prevent the blocked shift condition.

More specifically, the gear synchronization controller 78 is disposed in electrical communication with the drive gear 46, the driven gear 48 and the shifting mechanism 54, and when a "zero or low" speed gear engagement command is determined to be present by the gear synchronization controller 78, signifying the potential for tooth-to-tooth direct contact been the shifting teeth 10 and the gear teeth 12, a rotational shutter function is applied to the drive gear 46 (e.g., ring gear 60) based on at least one frequency, torque or speed rotational characteristic, in a steady manner or a series of rotational pulses, to move (i.e., rotate) the drive gear 46 (e.g., ring gear 60) about the axis A simultaneously during actuating and axial movement of the sliding mechanism 54 but prior to the state where contact between the shifting teeth 10 and the gear teeth 12 first occurs, for increasing the probability of the tapered, offset relationship shown in FIGS. 2-3 and preventing the blocked shift condition shown in FIG. 1. Although the remaining disclosure of the control method will be described in relation to the low speed condition and thus application of the rotational motor shutter function to the ring gear 60 as the drive gear 46, the gear synchronization control method could also be utilized to apply a rotational shutter function to the sun gear 54 as the drive gear 46 when a high speed engagement command is requested and the high speed slider clutch 66 is actuated and axially moved to establish the high speed condition, without departing from the scope of the subject disclosure. However, the rotational shutter function is preferably only applied to the drive gear 46 (e.g., gears of the first stage planetary gear assembly 52) which retain the ability to rotate during operation of the vehicle and not the driven gear 48 (e.g., output gear 62) since there is minimal movement capability for the driven gear, such as during a low-speed condition.

Figure 10:
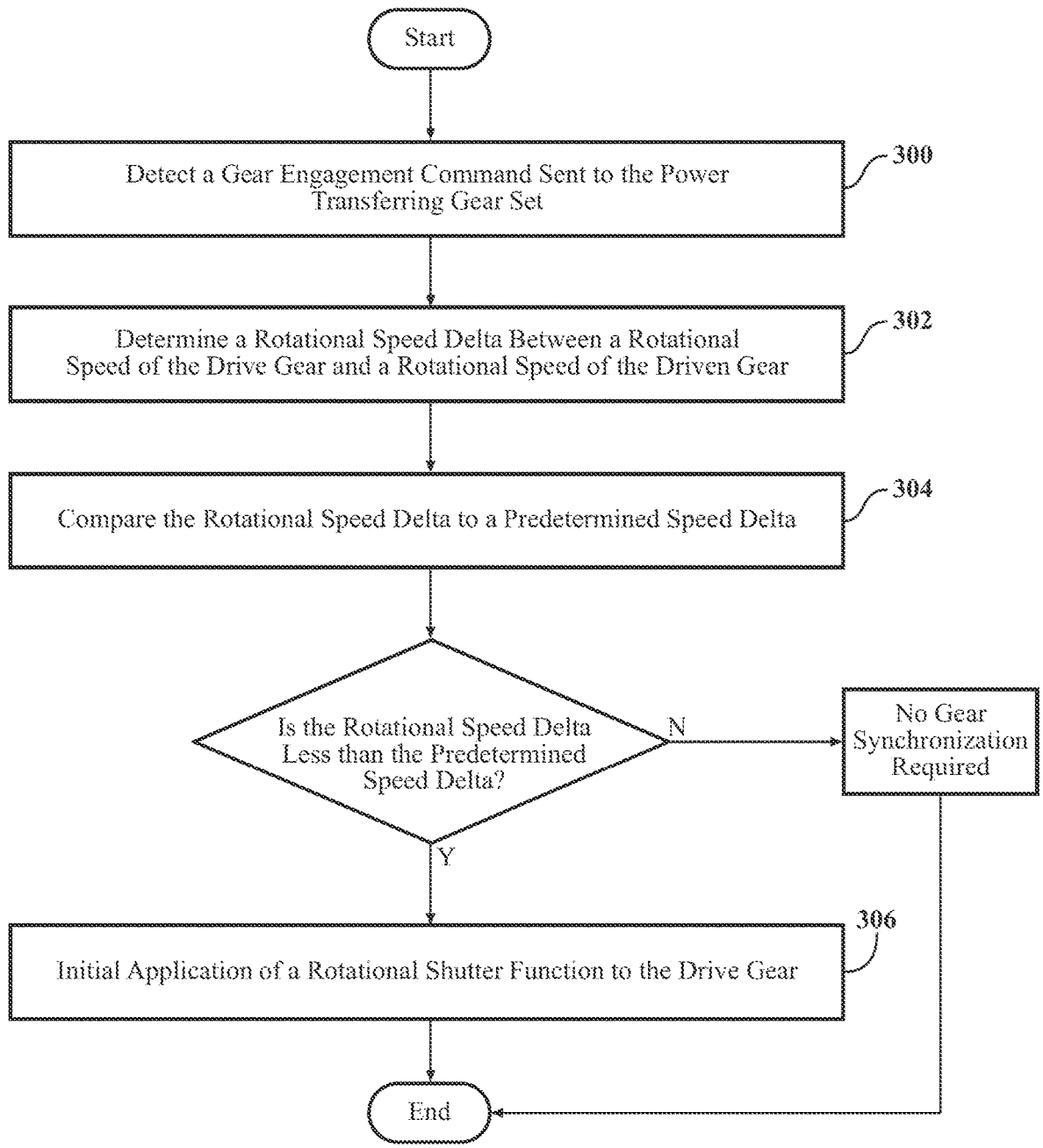
FIG. 10 is a flow chart illustrating a gear synchronization method performed by the gear synchronization controller during a determined "zero or low speed" engagement command to avoid a blocked shift condition.

As best illustrated in FIG. 10, the gear synchronization method performed by the gear synchronization controller 78 begins at step 300 when the gear synchronization controller 78 detects a gear engagement command being sent to the power transferring gearset 50. In response to detecting the gear engagement command, the gear synchronization controller 78 proceeds at step 302 to determine the rotational speed delta between a rotational speed of the drive gear 46 and a rotational speed of the driven gear 48. At step 304, the gear synchronization controller 78 proceeds to compare the rotational speed delta to a predetermined "zero or low" speed delta to determine if the rotational speed delta is less than the predetermined "zero or low" speed delta. For example, when the gear synchronization control method is used in association with a low speed shifting condition for the power transferring gearset 50, the predetermined "zero or low" speed delta can be set to 20 rpm. However, other predetermined "zero or low" speed delta values can be utilized without departing from the scope of the subject disclosure. In response to determining that the rotational speed delta is less than the predetermined speed delta, the gear synchronization controller 78 proceeds at step 306 to initiate application of a rotational shutter function to the drive gear 46. The rotational shutter function applies a series of clockwise and counterclockwise rotational cycles to the drive gear 46 simultaneously during the initial axial movement of the shifting mechanism 54 in response to the gear engagement command for preventing a blocked condition of the power transferring gearset 50 during an initial establishment of the meshed relationship between the shifting teeth 10 and the gear teeth 12.

As will be described in more detail in the various embodiments discussed below, the rotational shutter function comprised of the series of clockwise and counterclockwise rotational cycles applied to the drive gear 46 in response to initiation by the gear synchronization controller 78 are preferably based on at least one of the following pluralities of frequency, torque and/or speed functions (a-k):

a) Frequency—the period of time the drive gear is rotated about the axis by the gear synchronization controller in a clockwise/counterclockwise cycle; if followed by "b", "a" is the starting frequency used in a multi-frequency mode.

b) Ending Frequency—the final frequency of rotation in the rotational shutter function.

c) Frequency Shift Duration—The time period used to go from the initial frequency to the final frequency; change in frequency is typically divided across this time period although it could be disproportionate.

d) Forward Direction Percentage—the percentage of the frequency that is applied to the drive gear in the forward direction. The remaining portion of the frequency period is applied to the drive gear in the reverse direction. Supports disproportionate frequencies.

e) Initial Rotation Direction—Indicates the initial direction the drive gear is rotated when a rotational shutter function is initiated by the controller; 1=forward direction, −1=reverse direction.

f) Torque—the initial rotational force being applied to the drive gear when the rotational shutter function is initiated by the gear synchronization controller. If followed by "g", "f" is the starting force used in a multi-torque application mode. In the absence of "i", the same torque is applied both forwards and backwards in the rotational shutter function.

g) Ending Torque—the final torque level applied to the drive gear in the rotational shutter function.

h) Torque Shift Duration—The time period used to go from the initial torque level to the final torque level, change in torque is typically divided across this time period although it could be disproportionate.

i) Negative Torque—In conjunction with "f", "I" represents the torque applied to the drive gear in the negative direction. If followed by "j", "i" is the starting force used in a multi-torque application mode.

j) Negative Ending Torque—the final negative direction torque level applied to the drive gear in the rotational shutter function.

k) Negative Torque Shift Duration—The time period used to go from the initial negative torque level to the final negative torque level, change in torque is typically divided across this time period although it could be disproportionate.

Each clockwise and counterclockwise cycle in the series of rotational cycles has a rotational shutter frequency comprised of a calibratable period of time between moving the drive gear 46 in the clockwise direction and moving it in the counterclockwise direction. For example, a motor shutter frequency of 10 Hz, function RotationalShutter(a=10), would indicate that the motor direction change would complete a cycle every 100 ms. In an embodiment, rotational movement of the drive gear 46 in the clockwise and counterclockwise directions in each cycle are equal and comprised of 50% of the rotational shutter frequency, such as with 5 Hz (50 ms) going in the clockwise direction and 5 Hz (50 ms) going in the counterclockwise direction for a 10 Hz motor shutter frequency. Based upon the gear tooth interface design, the appropriate minimum frequency can be selected to ensure that the drive side gear free spinning movement is sufficient to enable a position where taper edge contact is possible as the gear engagement forces actively push the gearset together.

In another embodiment of the gear synchronization control, the rotational shutter frequency may be changed over a period of time and adjustable from a first rotational cycle in the series of rotational cycles to a last rotational cycle in the series of rotational cycles. For example, the rotational shutter frequency can be sequentially adjusted from 2 Hz for a first rotational cycle to 20 Hz for last rotational cycle over a calibratable time period, e.g., function RotationalShutter (a=2, b=20, c=3), applies a motor shutter frequency to the drive gear 46 from 2 Hz to 20 Hz evenly distributed across 3 seconds. In a related embodiment, the change in frequency could be changed in a non-evenly distributed manner. The benefit of changing the applied frequency over time is that it minimizes the actually applied frequency needed for gearset engagement between the shifting teeth 10 (e.g., on the low-speed slider clutch 68) and the gear teeth 12 (e.g., on the ring gear 60), thus minimizing the potential of audible noise.

In another embodiment of the gear synchronization control, a rotational direction of the driven gear is taken into account to set a non-proportional shutter frequency, e.g., function RotationalShutter(a=10, d=75) to the drive gear in which the rotational clockwise and counterclockwise movement in each cycle is not equal. For example, the non-proportional shutter frequency embodiment applies the shutter frequency (e.g., 10 Hz) to the drive gear with a positive rotational frequency (i.e., the greater of the clockwise or counterclockwise movements) lasting e.g. 75% of the associated time period in the frequency and with the negative rotational frequency (i.e., the lesser of the clockwise or counterclockwise movements) being experienced during the remaining 25% of the time period in the shutter frequency. Knowing rotational direction of the driven gear is used to determine the portion of the cycle that would represent the positive cycle (greater) in the shutter frequency. For example, if the driven gear 48 is indicative of forward movement, and clockwise rotation corresponds to forward direction, the same 10 Hz may be split disproportionately where the forward (i.e., clockwise) rotational direction in the cycle accounts for the positive frequency cycle and 75% of the shutter frequency (e.g., 75 ms clockwise rotation if the shutter frequency is 10 Hz) and the reverse direction accounts for the remaining negative frequency cycle and 25% of the cycle time (25 ms counterclockwise rotation). If the driven gear 48 is indicative of reverse movement, counterclockwise rotation, the motor shutter frequency could be reversed to function RotationalShutter(a=10, d=25); indicating a motor shutter frequency of 10 Hz with 25% of the cycle moving forward (i.e., clockwise rotational movement) and 75% of the cycle in the reverse direction (i.e., counterclockwise rotational movement). By leveraging a disproportionate motor shutter, the likelihood of gearset engagement in the desired direction of travel is greater. This minimizes the "jerk" effect an operator might encounter by having the drive gear 46 moving in the opposite direction, the gears engage, and then torque being applied in the desired direction.

Figure 11:
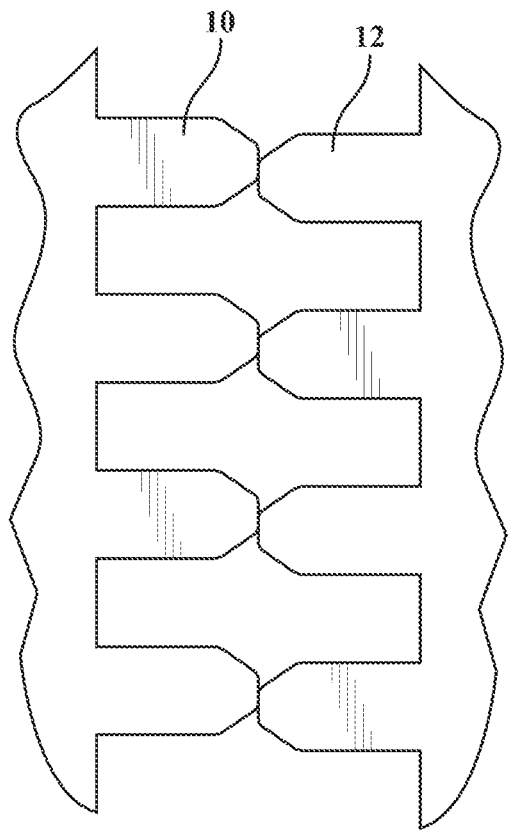
FIG. 11 is a side view illustrating the shifting teeth and the gear teeth disposed in a 50% gear overlap relationship.

In another embodiment of the gear synchronization control, gear position information (i.e., a relative position of the shifting teeth 10 to the gear teeth 12) is used to determine the initial direction of the shutter frequency. For example, if it is determined by the gear synchronization controller 78 that the gear overlap between the shifting teeth 10 (e.g., on the low speed slider clutch 68) and the gear teeth 12 (e.g., on the ring gear 60) have a 50% overlap (such as illustrated in FIG. 11), the gear synchronization controller 78 determined an initial rotational direction of the drive gear 46 which would minimize the requisite travel for the tapered edges of the shifting teeth 10 and gear teeth 12 to come into contact (and the shifting teeth 10 and gear teeth 12 to be in an aligned meshed relationship), and implements this initial rotational direction for the initial clockwise or counterclockwise direction of each rotational cycle. For example, function RotationalShutter(a=10, d=25, e=−1) indicates a rotational shutter frequency of 10 Hz with 25% of the cycle moving forward and 75% of the cycle in the reverse direction along with the first motor movement in the reverse direction. By minimizing the travel needed for gearset engagement between the shifting teeth 10 and the gear teeth 12, torque interruption is also minimized. Initiating the rotational shutter frequency in the opposite direction increases the distance of rotational travel of the drive gear before the tapered edges would come into contact; thus, increasing the torque interrupt time.

In a similar fashion, the gear synchronization controller 78 is configured to apply shutter torque which is the calibratable level of torque being applied to the drive gear during the rotational movement. In other words, the gear synchronization controller 78 can initiate application of a shutter torque during rotational movement of the drive gear in the clockwise and counterclockwise directions in each cycle. For example, in an embodiment a rotational shutter torque of 30 Nm, function RotationalShutter(a=10, f=30), would be indicative of the application of 30 Nm of rotational force to the drive gear as it shutters at 10 Hz, both in the forward or reverse direction. In other words, shutter torque applied to the drive gear in the clockwise and counterclockwise directions in each cycle are equal (e.g., 30 Nm) in both directions.

In another embodiment of the gear synchronization control, the shutter torque may be changed over a period of time; for example, from 2 Nm for a first rotational cycle in the series of rotational cycles to 30 Nm for a last rotational cycle in the series of rotational cycles. More specifically, a function RotationalShutter(a=10, f=2, g=30, h=3) results in the gear synchronization controller 78 configured to apply a shutter torque from 2 Nm to 30 Nm evenly distributed across 3 seconds at a 10 Hz frequency. In a related embodiment, the change in force could be changed in a non-evenly distributed manner over the series of clockwise and counterclockwise rotational cycles. The benefit of changing the applied force over time is that it minimizes the applied force required to drive gear engagement between the shifting teeth 10 and the gear teeth 12, thus minimizing the potential of mechanical noise and mechanical "jerk" experienced.

In another embodiment, a direction of the driven gear (e.g., clockwise or counterclockwise relative to the axis A) can be taken into account to set a non-proportional shutter torque, e.g., wherein the shutter torque applied to the drive gear in the clockwise and counterclockwise directions of each clockwise and counterclockwise rotational cycle are disproportionate, with a larger shutter torque applied during rotational movement in one of the clockwise or counterclockwise directions in each cycle and a smaller shutter torque applied during rotational movement in the other one of the clockwise or counterclockwise directions in each cycle. More specifically, a function RotationalShutter(a=10, f=30, i=5), applies a larger shutter torque of 30 Nm with positive rotational force coinciding with forward (clockwise) rotation and a smaller shutter torque of 5 Nm with negative rotational force coinciding with negative (counterclockwise) rotation, both applied across a 10 Hz frequency. Knowing desired gear direction is used to determine the portion of the cycle that would benefit from the higher applied levels of torque. For example, if the gear synchronization controller 78 determines that the driven gear 48 is indicative of forward (clockwise) movement, the application of higher levels of torque in the positive (clockwise) rotational direction coincides with the continuation of rotational direction upon gear engagement. Application of higher torque levels in the negative direction, function RotationalShutter(a=10, f=5, i=30) coincides with continuation of the reverse (counterclockwise) direction. By leveraging a disproportionate shutter torque, the likelihood of gearset engagement between the respective teeth 10, 12 of the shifting mechanism 66 and the driven gear 48 in the desired direction of travel is greater. This minimizes the "jerk" effect an operator might encounter by having the drive gear 46 moving in the opposite direction, the shifting mechanism 64 and the driven gear 48 engage, and then torque being applied in the desired direction.

An extension of this embodiment can be viewed in the example, function RotationalShutter(a=0, f=0, i=30). In this variation, a shutter torque of 30 Nm is applied only in one of the clockwise or counterclockwise directions of the drive gear 46 in each rotational cycle, for example only in the reverse (negative) direction at a frequency of 10 Hz. A further extension of this embodiment, a position of the driven gear 48 is used to determine the initial direction of the shutter torque application. In conjunction with the Initial Rotation Direction, "e", the application of torque in the positive, "f", and negative, "I", can be selected such that a larger shutter torque is in the clockwise or counterclockwise direction that minimizes the rotational travel of the drive gear needed for the shifting teeth 10 and the gear teeth 12 to be in aligned meshed relationship, such that the tapered edges are arranged to come into contact. By minimizing the travel needed for establishing the meshed relationship between the shifting mechanism 64 and the driven gear 48, torque interruption is also minimized. Initiating the shutter frequency in the opposite direction increases the distance of rotational travel of the drive gear 46 (and the shifting mechanism 64 operably coupled thereto) before the tapered edges would come into contact; thus, increasing the torque interrupt time.

In an additional embodiment, the application of torque, both in the forward or reverse direction can be changed over a calibratable time period. For example, function RotationalShutter(a=10, f=2, g=20,h=3, i=1, j=5, k=2) would indicate a forward and reverse rotation of the drive gear 46 at 10 Hz with the initial forward 2 Nm and a negative 1 Nm of torque applied. The forward torque would change from the initial 2 Nm to 20 Nm over a period of three seconds while the negative torque would grow from 1 Nm to 5 Nm over a period of 2 seconds. While the change in torque could be evenly distributed over the time period, an extension of this embodiment would allow such a change to be disproportionate.

As an example of combining the aforementioned embodiments, when a Zero Speed Gear Engagement is commanded (i.e., it is determined that the rotational speed delta between the drive gear 46 and the driven gear 48 is less that the predetermined speed delta (e.g., 20 rpm)), and knowing the shift is for the Reverse Gear, the function RotationalShutter (a=2, b=20, c=3, d=25, e=−1, f=0, g=0, h=0, i=5, j=40, k=3) is a function commanding a progressive change in shutter frequency and torque pulses starting in the negative (reverse) direction at 2 Hz with 5 Nm of force, with disproportionate duty cycle of 25% forward direction and 75% reverse direction. The frequency and applied torque changes over a period of 3 seconds to a 20 Hz frequency from the initial negative direction torque pulse of 5 Nm to 40 Nm of force. By initiating such a command, the likelihood of a blocked shift condition during a shift to Reverse to be encountered is minimal.

As the lubricant supported electric motor 30 may be controlled not only in a Torque Mode, but also a Speed Mode, the embodiments described related to the application of torque can be extended to reference the use of Motor Speed in place of Motor Torque.

In another embodiment, a self-learning algorithm based on prior results and a plant model of the system is used to dynamically adjust the Rotational Shutter function parameters to continually optimize gear synchronization during the Zero Speed Gear Engagement command.

From an implementation perspective, an inverter in an e-propulsion system controls the lubricant supported electric motor 30. Thus, the inverter is a natural home for placement of the controller 78 and implementation of the related rotational shutter function The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not regarded as a departure from the disclosure, and all such modifications are intended to be included within the scope of the disclosure.

Figure 13:
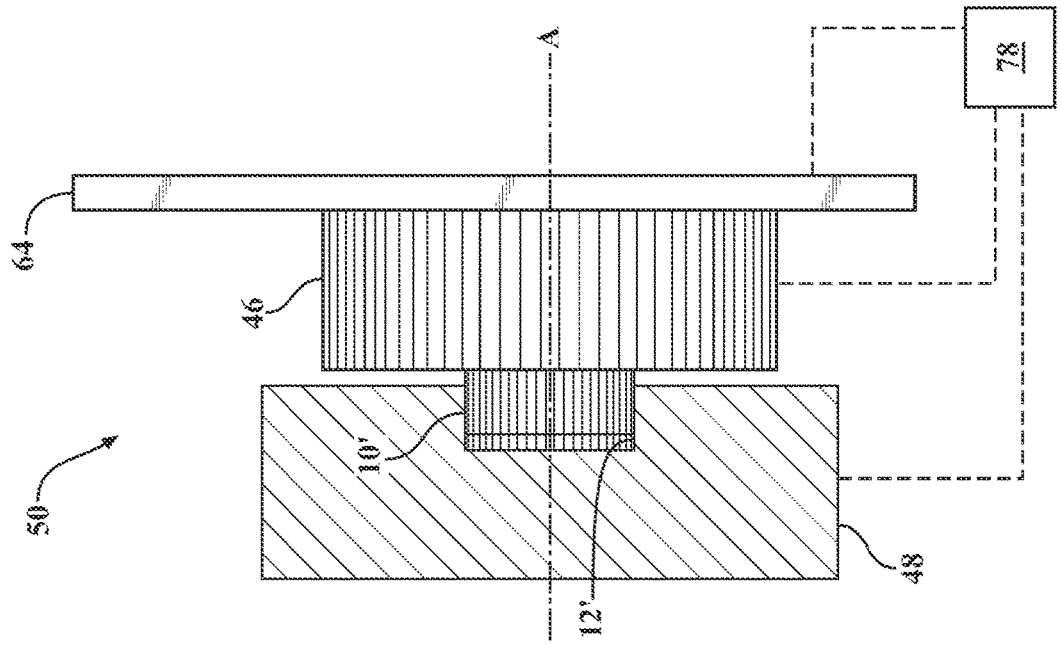
FIG. 13 is a cross-sectional view of the power transferring gearset of FIG. 12 illustrating one of the drive gear or the driven gear axially slid towards the other via the shifting mechanism to dispose the drive gear teeth on the drive gear in meshed relationship with the driven gear teeth of the driven gear.
Figure 12:
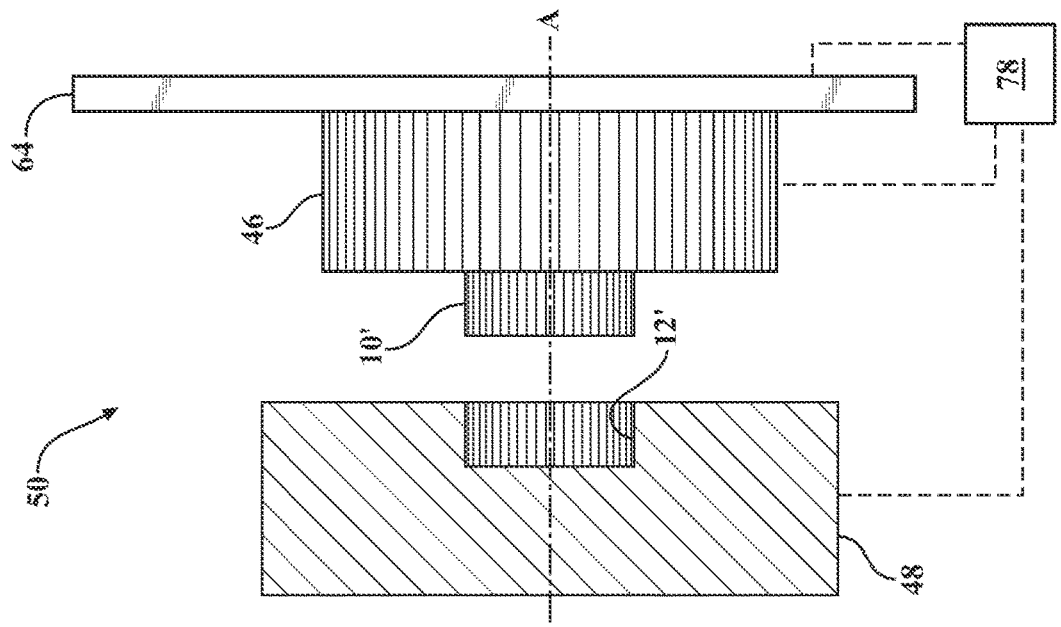
FIG. 12 is a cross-sectional view of another alternative arrangement of the power transferring gearset in which the drive gear presents drive gear teeth and the driven gear presents driven gear teeth.

For example, although illustrated and described above in relationship to shifting teeth 10 disposed on the shifting mechanism 64, as illustrated in FIGS. 12-13, the principles of the gear synchronization method and related gear synchronization controller 78 described herein could also be applied to the synchronized mating of drive gear teeth (which in this case would be represented as 10 in FIGS. 1-3) with driven gear teeth (which in this case would be represented as 12 in FIGS. 1-3) in response to sliding one of the drive gear 46 or the driven gear 48 axially towards the other, such as via a suitable shifting mechanism 64, such as a shift fork, or the like. In this instance, the rotational shutter function would still be applied to the drive gear 46 in accordance with the aforementioned principles, to decrease a likelihood of a blocked condition between the to-be-meshed teeth 10', 12' of the drive gear 46 and the driven gear 48.

More specifically, similar to the other arrangements, and as illustrated in FIGS. 12-13, the power transferring gearset 50 includes a drive gear 46 and a driven gear 48 each rotatable about the axis A. The drive gear 46 would present a plurality of drive gear teeth 10' arranged concentrically about the axis A, and the driven gear 48 would present a plurality of driven gear teeth 12' also arranged concentrically about the axis A for mating with the drive gear teeth 10'. A shifting mechanism 64 can be operably connected with one of the drive gear 46 or the driven gear 48 for sliding the operably coupled drive gear 46 or driven gear 48 towards the other to establish the meshed relationship of the drive gear teeth 10' with the driven gear teeth 12' to transfer torque from the drive gear 46 to the driven gear 48. The gear synchronization controller 78 is disposed in communication with the drive gear 46, the driven gear 48 and the shifting mechanism 64, and in response to detecting a gear engagement command is configured to determine a rotational speed delta between the drive gear 46 and the driven gear 48, and compare the rotational speed delta to a predetermined speed delta, such as the predetermined "zero or low" speed delta described above. In response to determining that the rotational speed delta is less than the predetermined speed delta, the gear synchronization controller 48 is configured to apply a rotational shutter function to the drive gear 46 in accordance with the previously described gear synchronization principles to apply a series of clockwise and counterclockwise rotational cycles to the drive gear 46 during simultaneous movement of the drive gear 46 or driven gear 48 towards the other for preventing a blocked condition between the drive gear teeth 10' and the driven gear teeth 12'.

What is claimed is:

1. A power transferring gearset for a motor of a vehicle comprising:

a drive gear and a driven gear each rotatable about an axis A;

a shifting mechanism operably coupled with one of said drive gear or said driven gear for rotation therewith;

said other of said drive gear or said driven gear presenting a plurality of gear teeth arranged concentrically about the axis A;

said shifting mechanism including a plurality of shifting teeth arranged concentrically about the axis A and axially slidable relative to said operably coupled one of said drive gear or said driven gear in response to a gear engagement command to advance said shifting teeth towards said gear teeth for ultimately disposing said shifting teeth and said gear teeth in meshed relationship with one another to transfer torque from said drive gear to said driven gear; and a gear synchronization controller disposed in communication with said drive gear, said driven gear and said shifting mechanism, and in response to detecting said gear engagement command configured to:

determine a rotational speed delta between a rotational speed of said drive gear and a rotational speed of said driven gear;

compare said rotational speed delta to a pre-determined speed delta; and in response to determining said rotational speed delta is less than said predetermined speed delta, initiating application of a rotational shutter function to said drive gear to apply a series of clockwise and counterclockwise rotational cycles to said drive gear simultaneously during said axial movement of said shifting mechanism for preventing a blocked condition of the power transferring gearset while establishing the meshed relationship between said shifting teeth and said gear teeth.

2. The power transferring gearset as set forth in claim 1, wherein each clockwise and counterclockwise rotational cycle in said series of clockwise and counterclockwise rotational cycles has a rotational shutter frequency.

3. The power transferring gearset as set forth in claim 2, wherein the rotational shutter frequency for each clockwise and counterclockwise rotational cycle is adjusted from a first rotational cycle in the series of rotational cycles to a last rotational cycle in the series of rotational cycles.

4. The power transferring gearset as set forth in claim 3, wherein the rotational shutter frequency for each clockwise and counterclockwise rotational cycle is sequentially increased from the first rotational cycle to the last rotational cycle.

5. The power transferring gearset as set forth in claim 2, wherein rotational movement of said drive gear in the clockwise and counterclockwise directions in each one of said clockwise and counterclockwise rotational cycles are equal and comprised of 50% of a motor shutter frequency.

6. The power transferring gearset as set forth in claim 2, wherein rotational movement of said drive gear in the clockwise and counterclockwise directions in each one of said clockwise and counterclockwise rotational cycles is disproportionate, with rotational movement of the clockwise or counterclockwise directions in each cycle being greater than 50% of the rotational shutter frequency to establish a positive rotational frequency of each cycle and rotational movement of the other one of the clockwise or counterclockwise directions in each cycle being less than 50% of the shutter frequency to establish a negative rotational frequency being equal to the rotational shutter frequency minus the positive rotational frequency.

7. The power transferring gearset as set forth in claim 6, wherein said gear synchronization controller is further configured to detect a clockwise or counterclockwise direction of said driven gear in response to detecting said gear engagement command, and to assign the positive rotational frequency to the corresponding clockwise or counterclockwise direction of the rotational cycle.

8. The power transferring gearset as set forth in claim 2, wherein said gear synchronization controller is further configured to initiate application of a shutter torque to said drive gear during rotational movement of said drive gear in the clockwise and clockwise directions in each cycle.

9. The power transferring gearset as set forth in claim 8, wherein the shutter torque applied to said drive gear in the clockwise and counterclockwise directions of each rotational cycle is equal.

10. The power transferring gearset as set forth in claim 9, wherein the shutter torque applied to said drive gear in each clockwise and counterclockwise rotational cycle is adjusted from a first rotational cycle in the series of rotational cycles to a last rotational cycle in the series of rotational cycles.

11. The power transferring gearset as set forth in claim 10, wherein the shutter torque applied to said drive gear in each clockwise and counterclockwise rotational cycle is sequentially increased from the first rotational cycle to the last rotational cycle.

12. The power transferring gearset as set forth in claim 8, wherein the shutter torque applied to said drive gear in the clockwise and counterclockwise directions in each rotational cycle is non-proportional, with a larger shutter torque applied during rotational movement of said drive gear in one of the clockwise or counterclockwise directions in each cycle and a smaller shutter torque being smaller than the larger shutter torque applied during rotational movement of said drive gear in the other one of the clockwise or counterclockwise directions in each cycle.

13. The power transferring gearset as set forth in claim 12, wherein said gear synchronization controller is further configured to detect a clockwise or counterclockwise direction of said driven gear in response to detecting said gear engagement command, and to assign the larger shutter torque to the corresponding clockwise or counterclockwise direction of the rotational cycle.

14. The power transferring gearset as set forth in claim 12, wherein said gear synchronization controller is further configured to determine a relative position of said shifting teeth and said gear teeth and a shorter rotational direction of said drive gear which would minimize requisite travel for establishing a meshed alignment between said shifting gear teeth and said gear teeth, and to assign the larger shutter torque to the corresponding clockwise or counterclockwise direction of the rotational cycle which matches the shorter rotational direction.

15. The power transferring gearset as set forth in claim 2, wherein said gear synchronization controller is further configured to initiate application of a shutter torque during rotational movement of one of the clockwise or counterclockwise directions but not the other of the clockwise or counterclockwise directions in each cycle.

16. The power transferring gearset as set forth in claim 1, wherein said gear synchronization controller is further configured to determine a relative position of said shifting teeth and said gear teeth and a shorter rotational direction of said drive gear which would minimize requisite travel for establishing a meshed alignment between said shifting gear teeth and said gear teeth, and implement the shorter rotational direction for the initial clockwise or counterclockwise direction in each rotational cycle.

17. The power transferring gearset as set forth in claim 1, wherein said predetermined speed delta is approximately 20 rpm.

18. The power transferring gearset as set forth in claim 1, wherein the motor is a wheel-end motor and said driven gear is operably connected to the wheel of the vehicle.

19. The power transferring gearset as set forth in claim 1, wherein the motor is an electric motor including a stator and a rotor extending along the axis A and rotatably disposed within the stator and said drive gear is operably connected with the rotor of the electric motor.

20. A method for synchronizing a power transferring gearset including a drive gear and a driven gear each rotatable about an axis, and a shifting mechanism operably coupled with one of the drive gear or the driven gear for rotation therewith, the method comprising, at a gear synchronization controller:

detecting a gear engagement command which axially slides the shifting mechanism relative to the operably coupled one of the drive gear or the driven gear and towards the other of the drive gear or driven gear to ultimately dispose shifting teeth on the shifting gear into meshed relationship with gear teeth on the other of the drive gear or driven gear;

in response to detecting the gear engagement command, determining a rotational speed delta between a rotational speed of the drive gear and a rotational speed of the driven gear;

comparing the rotational speed delta to a pre-determined speed delta; and in response to determining that the rotational speed delta is less than the predetermined speed delta, initiating application of a rotational shutter function to the drive gear to apply a series of clockwise and counterclockwise rotational cycles to the drive gear simultaneously during the axial movement of the shifting mechanism for preventing a blocked condition of the power transferring gearset while establishing the meshed relationship between the shifting teeth and the gear teeth.

* * * * *